June 18, 1968     L. H. BARNETT ETAL     3,388,429
THERMODYNAMIC CASTING MACHINE
Filed Nov. 27, 1963     4 Sheets-Sheet 1
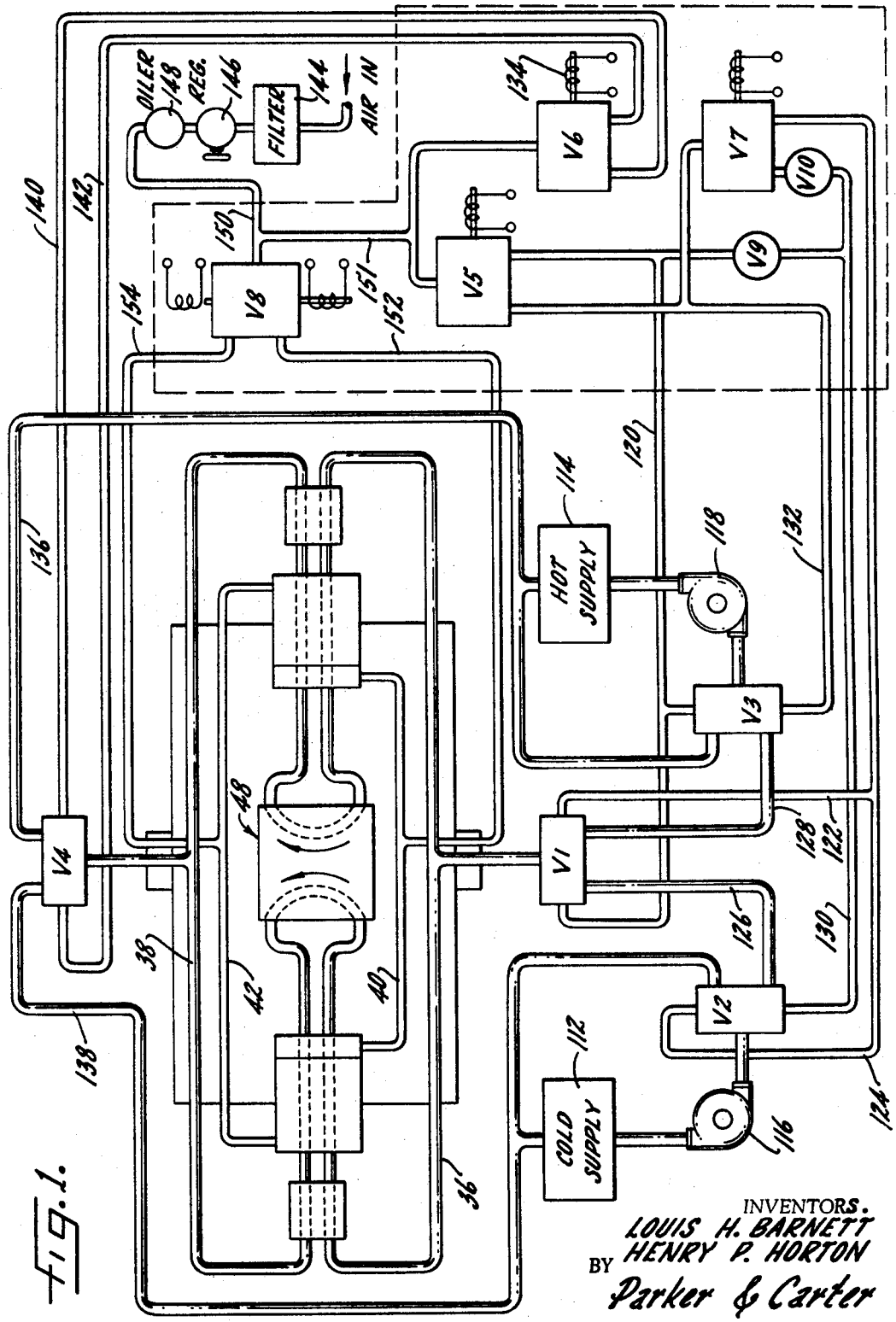
INVENTORS.
LOUIS H. BARNETT
HENRY P. HORTON
BY
Parker & Carter
ATTORNEYS.

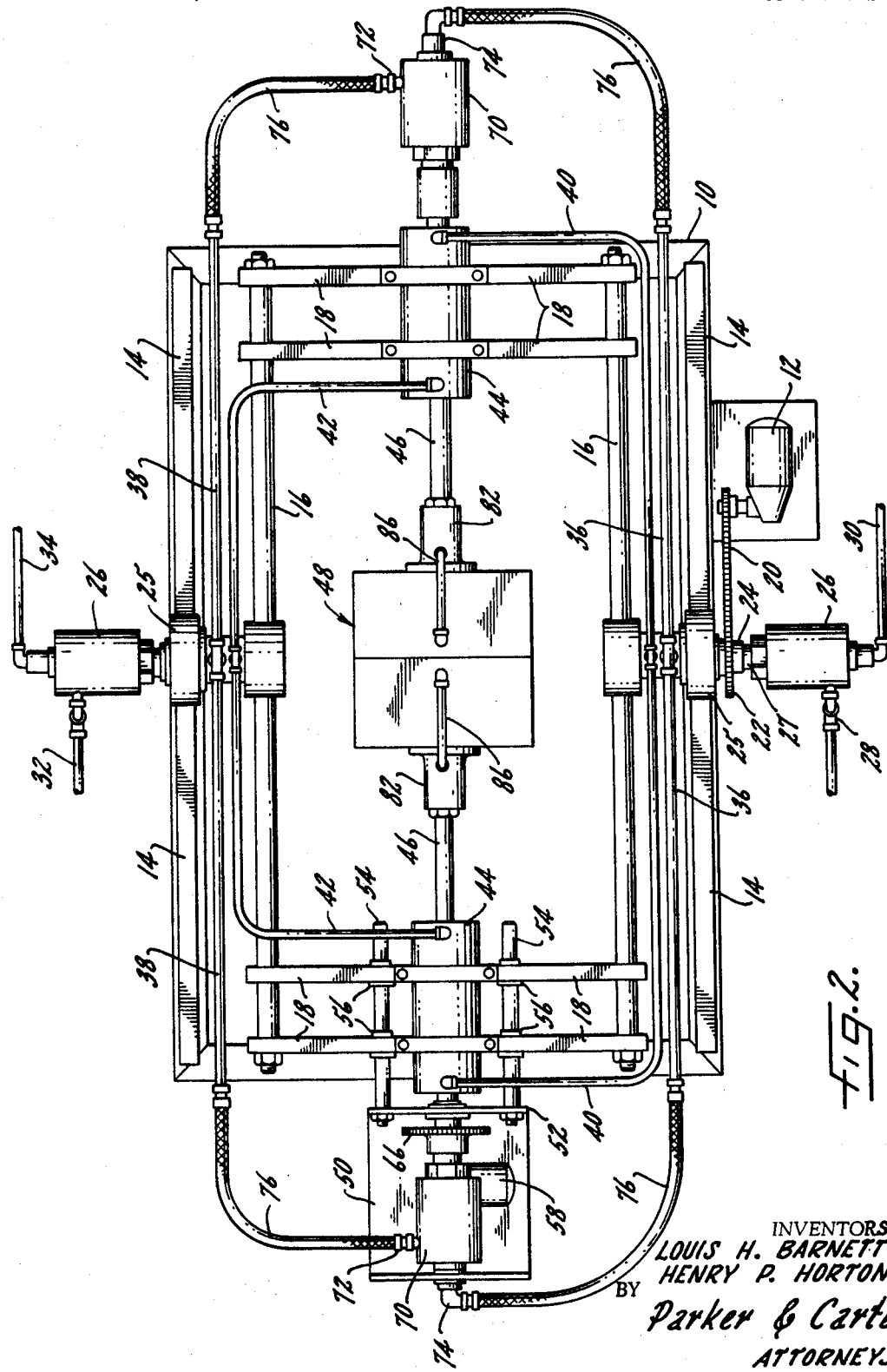

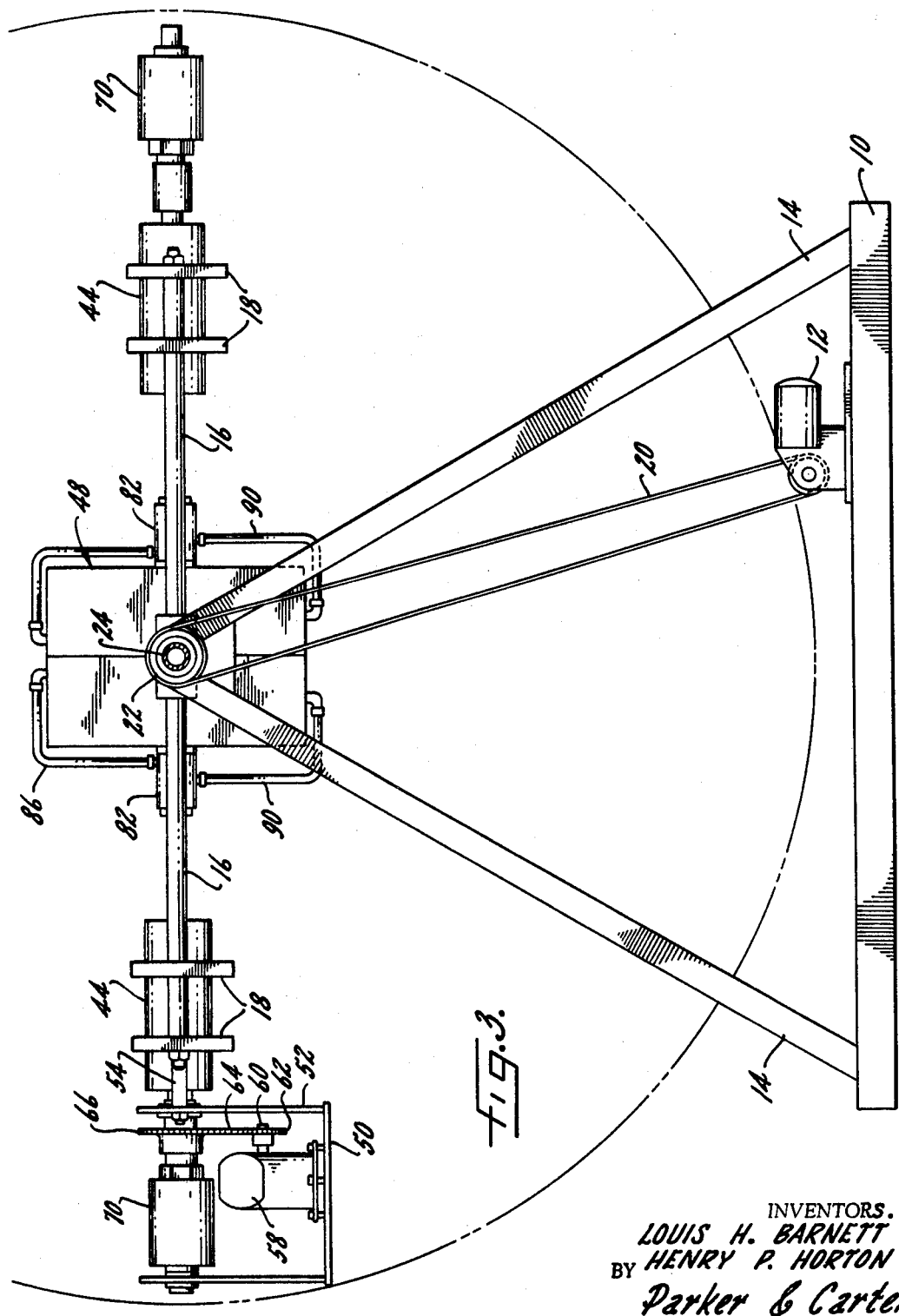

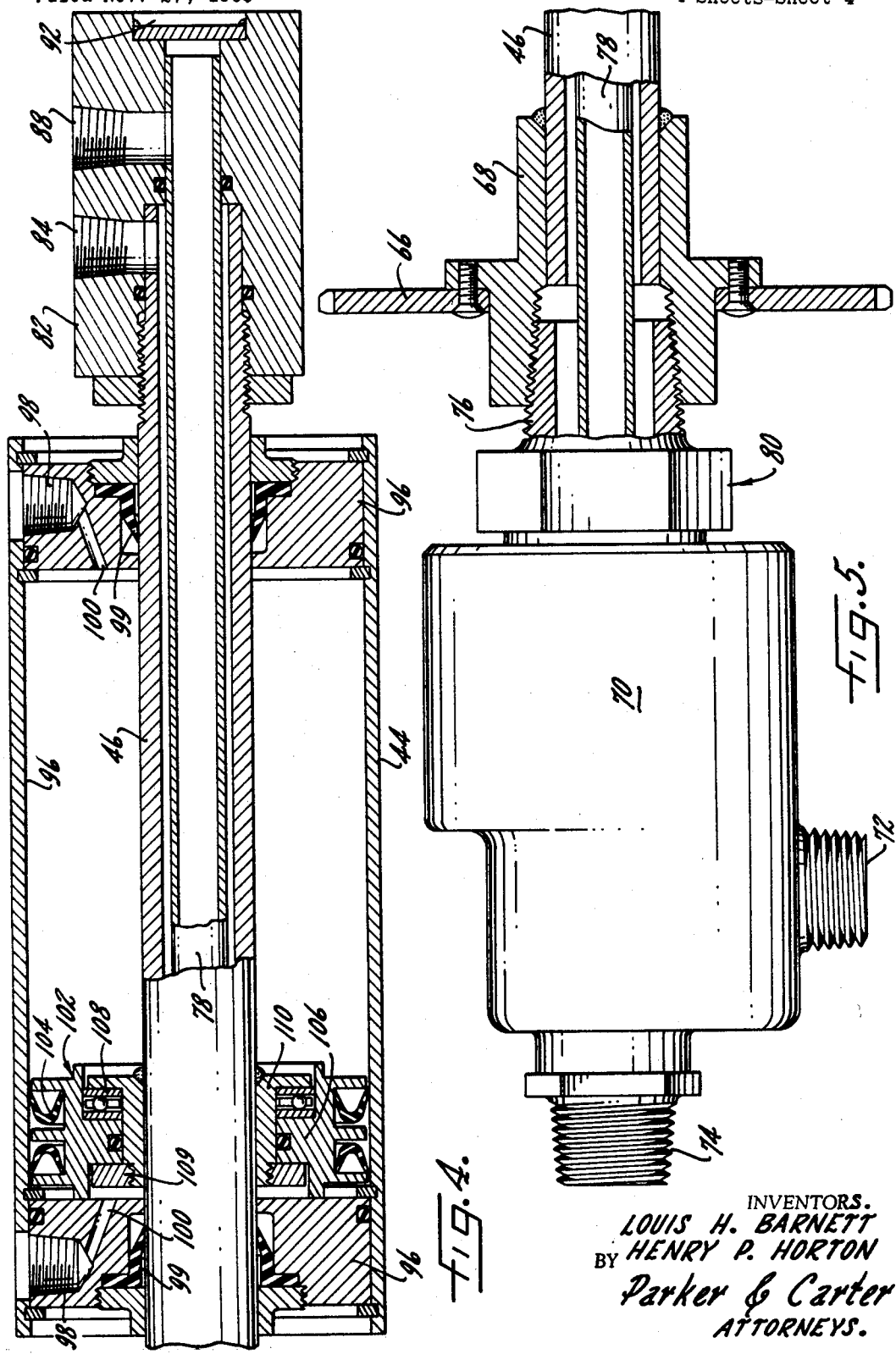

United States Patent Office 3,388,429
Patented June 18, 1968

3,388,429
THERMODYNAMIC CASTING MACHINE
Louis H. Barnett and Henry P. Horton, Fort Worth, Tex., assignors, by mesne assignments, to Vistron Corporation, Cleveland, Ohio, a corporation of Ohio
Filed Nov. 27, 1963, Ser. No. 326,561
6 Claims. (Cl. 18—26)

This invention relates to a thermofusion rotational molding machine and in particular to a machine of the type described in which the same substance, whether it be a liquid or gas, is used for both heating and cooling the mold.

A primary purpose of the invention is a molding machine of the type described in which a single substance is used for heating and cooling, there being one reservoir for supplying the substance in a cool state and another reservoir for supplying the substance in a heated state.

Another purpose is a rotational molding machine of the type described including means for maintaining minimum intermixing of the heating and cooling substances.

Another purpose is to provide improvements in a molding machine of the type described, particularly in the control and supply of the heating and cooling fluids.

Another purpose is a rotational molding machine including means for rotating the mold simultaneously about mutually perpendicular axes, the machine including means for moving the mold sections toward and away from each other to open and close the mold.

Another purpose is a simply constructed reliably operable molding machine of the type described.

Other purposes will appear in the ensuing specification, drawings and claims.

The invention is illustrated diagrammatically in the following drawings wherein:

FIGURE 1 is a diagrammatic illustration of the heating and cooling control system as well as the air system for operating the mold sections, FIGURE 2 is a top plan view of a molding machine of the type described, FIGURE 3 is a side view of the molding machine shown in FIGURE 2, FIGURE 4 is an enlarged partial section of the piston and cylinder assembly for opening and closing the mold and for supplying the heating and cooling substances to the mold, and FIGURE 5 is an enlarged partial section of the outer end of the mold support assembly and mold reciprocating structure.

As shown in FIGURES 2 and 3, a base 10 may mount a suitable drive motor 12 and angular support bars 14, there being a pair of support bars on each side of the base. A framework made up of longitudinal strain rods 16 and spaced end yokes 18, there being a pair of yokes 18 at each end of the strain rods 16, is rotatably mounted at the upper joined ends of each pair of support bars 14. The motor 12 is effective through a chain or other suitable flexible drive member 20, to drive a sprocket 22 fixed on a shaft 24. There is a shaft 24 fixed at the center of each strain rod 16 with each shaft 24 being journaled in the upper joined ends of the support bars 14.

Rotary unions 26 are attached to each side of the machine on the outboard end of an inner shaft 27 extending within each shaft 24. The bottom union 26, as shown in FIGURE 2, has an inlet connection 28 for the heating and cooling media or substances and an inlet connection 30 which may supply air for closing the mold. The top union 26 may have a discharge or exhaust connection 32 for the heating and cooling media and an air inlet 34 for opening the mold. The rotary unions 26 are stationary, but are effective to connect the external fluid sources, through the rotating shafts 24, into the fluid and air conduits on the frame. The conduit for supplying the heating and cooling media to the mold is indicated at 36, with the exhaust or discharge conduit being indicated at 38. The air conduit for closing the mold is indicated at 40 and the air conduit for opening the mold is indicated at 42. The motor 12 is effective to rotate the entire frame described above and all of the fluid conduits.

Fixed to each pair of spaced yokes 18 is a piston and cylinder assembly indicated generally at 44, with each piston and cylinder assembly being connected by a movable or reciprocal sleeve 46 to a sectional mold indicated generally at 48. At the left-hand side of FIGURE 2 there is a platform 50 having an inner side wall 52 which is fixed to parallel guide rods 54. The guide rods 54 are slideable in bushings 56 mounted in the yokes 18. Mounted on platform 50 is a suitable motor 58 having a drive shaft 60 and a gear or the like 62 mounted on the drive shaft. A chain or other suitable flexible drive member 64 is driven by the gear 62 and drives a sprocket or the like 66 fixed on a collar 68 indicated in FIGURE 5. Motor 58 is effective to drive the mold about the axis of sleeve 46.

Turning now to FIGURES 4 and 5, rotary unions 70 are positioned at each end of the frame, each rotary union having an inlet connection 72 for the heating and cooling media and an outlet connection 74 for discharge of the heating and cooling media. Flexible cables 76 connect the inlet and outlet connections with the conduits 36 and 38. Extending inwardly from each union 70 is a threaded nut-like member 76 which mounts the collar 68. Fixed to each collar 68 is a sleeve 46 described above. Concentric with and mounted internally of each sleeve 46 is a second sleeve 78 which extends inwardly into each rotary union 70. The interior of each sleeve 78 is effective as a discharge conduit or passage and is connected to the opening 74. The area outside of sleeve 78 and within sleeve 46 may be used as the inlet passage. This could be reversed, and the invention should not be limited to the particular structure shown. The member 76 may be rotatably mounted to the union 70 by means of a bearing assembly indicated generally at 80. The sprocket 66 is effective to rotate sleeve 46 and the internal sleeve 78 through a connection described hereinafter. The unions do not rotate.

Sleeves 46 and 78 extend through the piston and cylinder assemblies 44 and are attached at their inner ends to one of the sections of mold 48. Each sleeve 46 may be threaded to a connecting block 82 having an inlet port 84 connected to an inlet line 86 which carries the heating and cooling media into the mold. Block 82 may have a discharge port 88 connected to a discharge line 90. The far right-hand end of block 82, as shown in the drawings, may connect to the mold proper, as indicated at 92.

Each piston and cylinder assembly 44 includes an outer cylindrical cover 94 having cover members 96 fixed at either end. Seals 99 bear against sleeve 46 to seal the cylinders. Ports 98 are formed in cover members 96 and passages 100 lead from each of the ports into the interior of the cylinder 94. A reciprocal piston indicated generally at 102 has outer seals 104 bearing against the inner surface of cylinder 94, with each of the pistons 102 being fixed to a sleeve 46 to reciprocate it. The piston structure may include a piston member 106 connected through a thrust bearing 108 and nut 109 to a collar or the like 110 which in turn is welded or otherwise suitably connected to the sleeve 46. The exact structure of the piston is not essential to the invention.

The heating and cooling media or substances may be either liquid or gas, and the term fluid or media is meant to include a substance in either state.

The control system is illustrated in FIGURE 1. The cooling fluid supply reservoir is indicated at 112 and the hot fluid supply reservoir is indicated at 114. A pump 116 is associated with the cold supply and a pump 118 is associated with the hot supply. Valve V1 controls the supply of the hot and cool fluids to conduit 36 and may be operated by air or any other suitable means. As shown herein, when valve V5 is in one position, valve V1 will supply hot fluid to the mold and when valve V5 is in the opposite position, it will supply cold fluid to the mold. Valve V5 is connected by conduit 120 to one side of valve V1. The opposite side of valve V1 is connected through conduit 122, conduit 124 and valve V7 back to valve V5.

Valve V2 controls the cold supply and when in one position the cold supply is circulated by the pump and when in the opposite position, it is effective to supply the cold fluid through line 126 to valve V1. In like manner, valve V3 controls the hot supply and when in one position will permit the hot fluid to circulate and when in the opposite position will direct hot fluid through line 128 to valve V1. The position of valves V2 and V3 is controlled by valves V5 and V7 and check valves V10 and V9. Conduit 130 connects valve V2 to valve V7 and conduit 132 connects valve V3 to valve V5.

Valve V4 is positioned at the discharge side of the fluid system. A suitable conventional temperature sensitive switch means, for example a thermocouple, may be positioned at the discharge side of the system and is effective, through coil 134, to control the position of valve V6. Whenever the temperature sensitive device at the discharge indicates that the hot fluid is passing through valve V4, valve V6 will either move or hold valve V4 in position to direct the hot fluid through conduit 136 back to the hot supply. In like manner, when the temperature sensitive device indicates a lack of a heated fluid, or a cooling fluid, valve V6 will be in the opposite position and the fluid passing through valve V4 will be discharged through conduit 138 to the cold supply 112. Valve V4 may be operated by air, or some other suitable means, through conduits 140 and 142 which are controlled by valve V6.

Valve V8 controls the opening and closing of the molds. Incoming air, which will be under pressure, is supplied through a filter 144, a regulator 146 and an oiler 148 to valve V8. Conduit 150, which connects to valve V8, also connects to conduit 151 which directs air to valves V5 and V6. When valve V8 is in one position, the molds will be opened, that is, when air is supplied through conduit 152. In like manner, to close the molds, air will be supplied through conduit 154.

The use, operation and function of the invention are as follows:

The first step in the molding process is to charge the open mold sections with a suitable plastic material. A thermosetting or a thermoplastic resin is satisfactory as are other types of plastics which are suitable for molding the desired article. The invention should not be limited to any size or shape of article or to any particular type of mold. After the molds have been charged they are closed through the air system described. Valve V8 will be moved to a position to direct air under pressure through conduits 152 and 40.

The molds will be rotated about mutually perpendicular axes by the two motors described, with motor 12 driving the entire frame and motor 58 rotating the mold about an axis within the frame. It is important to note that not only do the molds rotate about an axis within the frame, but the sleeves 46 rotate within stationary cylinders 94. Unions 70 remain rotationally fixed. The drive motor for rotating the mold within the frame is at one end of the frame and the rotary motion is transferred through the mold halves which are firmly held in contact by the air system. The opening and closing of the molds, which is controlled by the air system, causes reciprocation of sleeves 46, the unions 70 at each end, the platform 50 and the motor 58. The cylinders remain stationary, being fixed to the yokes 18, but the pistons and sleeves reciprocate upon opening and closing of the molds. In this connection, in some applications only one of the mold sections may reciprocate within the other.

Of primary importance in the invention is the fact that the same substance is used for both heating and cooling. This substance may be a liquid, it may be a gas, or it may be a substance or medium in which the heated state is in a gaseous condition and the cooling state is in a liquid state. What is important is that it be the same substance. A silicone having a workable temperature range of from 1000° F. to −40° F. has been found to be a satisfactory substance, although the invention obviously should not be so limited. Steam and water are satisfactory states of the same substance for heating and cooling. Of particular advantage in using a single medium or substance is that complete separation of the heating and cooling fluids is not necessary and the same passages within the mold halves or mold sections can be used for both heating and cooling. Also, the mold cycle may be substantially reduced, for example as low as 30 seconds, for some applications.

During the mold cycle when it is necessary to change from heating to cooling, valves V5 and V7 are operated, either by a timing device or by an operator, to stop the supply of hot fluid to valve V1 and to start the supply of cold fluid. The cold fluid will, in effect, chase the hot fluid through the passages in the mold support structure and the mold, and push the hot fluid out through valve V4. As soon as there is an absence of hot fluid at valve V4, valve V6 will change positions to direct the discharging fluid through conduit 138 to the cold supply. There will be a small amount of intermixing of the hot and cold fluids, but as long as the fluids are the some substance, there is no problem. The amount of intermixing is very small. The temperature sensitive device at valve V4 is effective to change the position of this valve whenever there is a change in the temperature of the fluid passing through valve V4.

The structure shown for carrying the hot and cold fluids, as well as the air system, are important. It is difficult to provide fluid passages through rotary systems of the type described, particularly when the mold rotates about two mutually perpendicular axes. The piston and cylinder assembly for closing and opening the molds incorporates the fluid passages for supplying the hot and cold fluid to the molds.

Instead of using separate supplies for the hot and cold fluids, there may be a single source of supply and means for both heating and cooling the fluid. For example, an electronic heating element cast into a mold may be used for heating. Cooling may be accomplished by ethyl glycol or refrigerated water.

Of particular importance in the overall invention is the ease of installation. A battery or series of machines may all be connected to common reservoirs.

Whereas the preferred form of the invention has been shown and described herein, it should be realized that there are many modifications, substitutions and alterations thereto, within the scope of the following claims.

We claim:

1. Apparatus for manufacturing molded articles comprising in combination:
   (a) a frame mounted rotatably about a horizontal axis on a first pair of oppositely and linearly disposed shafts each of said first pair of shafts having at least two fluid conducting passages;
   (b) a sectional jacketed mold comprising a first section and a second section, demountably disposed on a second pair of rotatable, oppositely and linearly disposed shafts, each of said second pair of shafts having two fluid-conducting passages, said mold being rotatable about an axis substantially normal to said horizontal axis;
   (c) at least one fluid-activated piston and cylinder assembly disposed on said frame to provide reciprocal motion to at least one shaft of said second pair of shafts;

(d) said jacketed mold including a chamber embracing substantially each entire mold section, said chamber having an inlet and an outlet for heat transfer fluid;

(e) means for circulating a single heat transfer fluid within said chamber to alternately heat and cool said mold sections;

(f) means for providing fluid to said piston and cylinder assembly alternately to displace said one shaft of said second pair of shafts into a mold-closing position and into a mold-opening position;

(g) valving means for controlling the flow of both hot and cold heat transfer fluid within said chamber;

(h) temperature-sensitive means coacting with said valving means to direct hot heat transfer fluid into a hot-fluid circulation system and relatively cool heat transfer fluid into a cold-fluid circulation system;

(i) motor means for rotating said frame;

(j) motor means disposed upon said frame for rotating said mold, and (k) means for indexing said frame in a mold-loading position at the start of each cycle and in a mold-stripping position at the end of each cycle.

2. An apparatus for the production of molded articles by continuous multiaxial rotation during the heating cycle of a partially filled sectional mold wherein a single heat transfer fluid is circulated through said mold to alternately heat and cool said mold, the improvement consisting of:

(a) said sectional mold being demountably disposed on a pair of oppositely and linearly disposed shafts, each of said pair of shafts having two fluid-conducting passages, and at least one of said pair of shafts being reciprocally movable from a mold-open position to a mold-closed position;

(b) a pneumatically activated piston and cylinder assembly, mounted on a frame within which said mold is centrally disposed, to provide reciprocal motion, to open and close said mold, to at least one of said pair of shafts;

(c) motor means disposed on said frame to rotate said mold about an axis substantially normal to the axis of rotation of said frame;

(d) valving means for controlling the flow of both hot and cold heat transfer fluid circulated through said mold;

(e) temperature-sensitive means coacting with said valving means to direct hot heat transfer fluid into a hot-fluid circulating system and relatively cool heat transfer fluid into a cold-fluid circulation system; and, (f) oppositely and linearly disposed fluid-conducting support shafts about which said frame is rotatable, said support shafts being connected through rotary unions to a source for activating said piston and cylinder assembly and to said hot-fluid and cold-fluid circulation systems.

3. The apparatus of claim 1 wherein said first section and said second section have cooperating seats adapted to form a seal and wherein said frame carries two pneumatic piston and cylinder assemblies to provide reciprocal motion to open and close said mold, for each of said second pair of shafts.

4. The apparatus of claim 3 wherein said pneumatic piston and cylinder assemblies may be operated by pressurized gas or by vacuum.

5. The apparatus of claim 2 wherein said sectional mold has cooperating seats adapted to form a seal and wherein said frame carries two pneumatic piston and cylinder assemblies to provide reciprocal motion for each of said pair of shafts.

6. The apparatus of claim 5 wherein said pneumatic piston and cylinder assemblies may be operated by pressurized gas or by vacuum.

References Cited
UNITED STATES PATENTS

| | | | |
|---|---|---|---|
| 2,536,692 | 1/1951 | Miller | 18—26 X |
| 2,740,159 | 4/1956 | Berg | 18—26 |
| 3,095,260 | 6/1963 | Ferriot | 18—26 X |
| 3,117,346 | 1/1964 | Bertin et al. | 18—26 |
| 3,173,175 | 3/1965 | Lemelson | 18—26 |
| 1,812,242 | 6/1931 | Jensen. | |
| 2,659,107 | 11/1953 | De Bell | 18—26 X |
| 2,696,024 | 12/1954 | Mobley et al. | 18—26 X |
| 3,104,423 | 9/1963 | Kemfer | 18—26 |
| 3,275,733 | 9/1966 | Schule et al. | 18—26 X |

WILLIAM J. STEPHENSON, *Primary Examiner.*